United States Patent [19]

Colaiaco

[11] 4,141,054
[45] Feb. 20, 1979

[54] SEISMIC TOLERANT ELECTRICAL UNIT SUBSTATION

[75] Inventor: August P. Colaiaco, Wilkinsburg, Pa.

[73] Assignee: Westinghouse Electric Corp., Pittsburgh, Pa.

[21] Appl. No.: 837,479

[22] Filed: Sep. 28, 1977

[51] Int. Cl.² .............................................. H02B 1/04
[52] U.S. Cl. .................................. 361/333; 361/334; 361/341; 174/16 B
[58] Field of Search .................... 174/88 B, 99 B, 28, 174/16 B; 361/331, 332, 333, 334, 335, 341

[56] References Cited

U.S. PATENT DOCUMENTS

| | | | |
|---|---|---|---|
| 3,794,849 | 2/1974 | Perry | 174/16 B |
| 3,917,985 | 11/1975 | Finley | 361/332 |
| 4,029,890 | 1/1977 | Nakata | 174/16 B |
| 4,059,723 | 11/1977 | Floessel | 174/16 B |
| 4,072,999 | 2/1978 | Vohman | 361/333 |

OTHER PUBLICATIONS

Westinghouse, *Unit Substation Throat Housing*, I.L. 48-300-1A, Jul. 1959.

*Primary Examiner*—Gerald P. Tolin
*Attorney, Agent, or Firm*—M. J. Moran

[57] ABSTRACT

Closely spaced electrical substation equipment such as transformers and associated switchgear are provided with a seismic electrical interconnection. The seismic electrical interconnection is capable of maintaining electrical continuity between the transformer and the switchgear during a seismic event such as an earthquake of predetermined magnitude. The interconnection between the transformer and switchgear is made close to the equipment support pad where the relative motion between them is least.

19 Claims, 4 Drawing Figures

SEISMIC TOLERANT ELECTRICAL UNIT SUBSTATION

BACKGROUND OF THE INVENTION

1. Field of the Invention

The subject matter of this invention relates generally to connections for unit substations and relates more particularly to the type of connections adapted for use during seismic events.

2. Description of the Prior Art

Interconnection of unit substation devices such as transformers and switchgears is well known in the prior art. An example of a prior art interconnection is shown in the Westinghouse Electric Corporation Instruction Paper entitled "Unit Substation Throat Housing," identified by the reference symbols I.L. 48-300-1A, dated July, 1959. FIG. 1 of the latter bulletin is similar to FIG. 1, prior art of the drawings of this application. A duct for interconnecting high voltage devices at a relatively high vertical point on high voltage devices is shown in U.S. Pat. No. 3,515,976, issued on June 20, 1970 to J. Huret et al. Furthermore, connections of bus apparatus are shown in U.S. Pat. No. 3,489,846, issued Jan. 13, 1970 to J. A. Fehr, Jr.; U.S. Pat. No. 3,485,936, issued Dec. 23, 1969 to L. C. Goodridge; and U.S. Pat. No. 3,591,707, issued July 6, 1971 to G. F. Swench et al. The patent of Huret shows a relatively rigid interconnection between spaced high voltage apparatus. The patents to Fehr, Goodridge and Swench show expansion joint systems which are generally adapted for thermal expansion. It would be advantageous if a way could be found to interconnect relatively closely spaced high voltage electrical equipment utilizing the existing electrical output and input terminals of the electrical apparatus in question and using an appropriate seismic tolerant protective bus run structure. It is known that during a seismic event such as an earthquake the relative mass, height, depth, width and other physical characteristics of transformer and switchgear equipment may allow the apparatus to vibrate at different resonant frequencies upon being excited by the earthquake. The vibration may take the form of twisting or translation and may be in many planes or in one plane. The vibration may be such that at any instant of time the various pieces of switchgear equipment are moving towards each other or away from each other or in any number of different modes. It has been determined that one kind of motion which affects the interconnection between the devices occurs in a vertical plane which includes the interconnecting conductors between the devices. Furthermore, a very destructive situation exists when the devices move directly towards each other or directly away from each other. The relative motion tends to cause the interconnecting conductors to break or to cause the housing or bus run to break and interrupt service.

SUMMARY OF THE INVENTION

In accordance with the invention, vertical bus bars are run from the relatively highly positioned connectors of the unit substation devices to a point close to the support pad upon which the devices are disposed. Flexure or vibration of the devices is less pronounced close to the base of these devices which is at the surface of the vertical pad. Conversely, the vibration is most pronounced closer to the top of these devices where the actual input connections must be made. It is advantageous, therefore, to make the horizontal interconnection between the devices at a low point relative to the support pad even though the existing connections tend to exist at a relatively high point. In one embodiment of the invention a solid horizontal bus bar may be utilized and interconnected with the vertical bus bars by way of a rotating joint. This allows the bus bars to flex or rotate relative to the rotating joint in each case. Furthermore, it allows the interconnecting horizontal bus bar to translate upwardly or downwardly within limits or from left to right or right to left within limits and furthermore it allows the bus bar to change angular dispositions within limits, all in reaction to the relative disposition of the two bus bars at the point of interconnection. In an extreme case the vertical bus bars can bow or flex somewhat to add an additional increment of translation without causing the interconnecting apparatus or protective bus run to break. In another embodiment the connection between the vertical bus bars is made with a flexible conductor, such as a braided connector.

BRIEF DESCRIPTION OF THE DRAWINGS

For a better understanding of the invention reference may be had to the peferred embodiments exemplary of the invention shown in the accompanying drawings in which.

DESCRIPTION OF THE PREFERRED EMBODIMENTS

Figure 1:
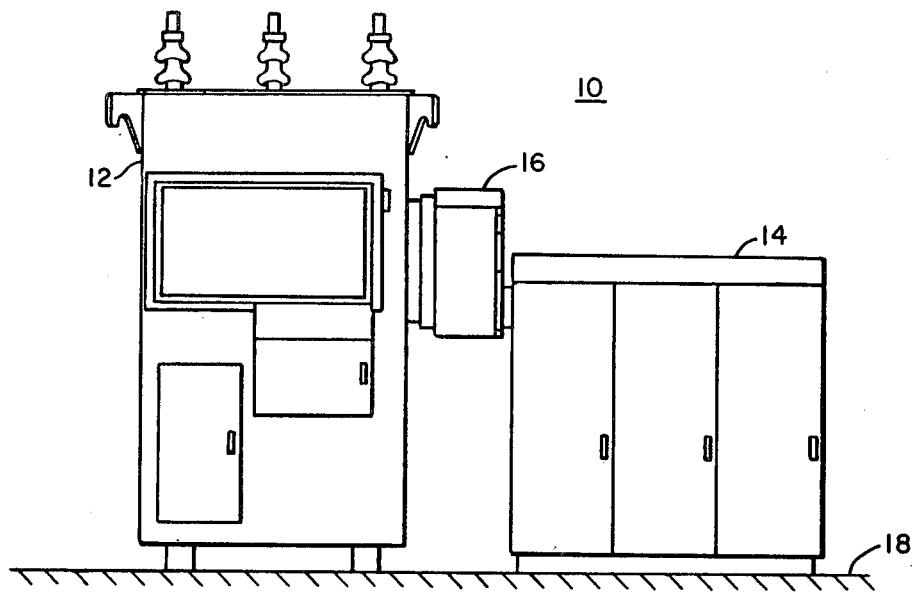
FIG. 1 shows a prior art unit substation with interconnecting throat housing.

Referring now to the drawings and FIG. 1 in particular a portion of a prior art unit substation is shown. Shown at the left as viewed in FIG. 1 is a transformer 12 which is firmly anchored upon a horizontal support pad 18. Disposed at the right of FIG. 1 is switchgear equipment 14 which also is firmly anchored to the horizontal pad 18. A housing 16 is shown interposed between the transformer 12 and the switchgear 14. Housing 16 is for bus bars and flexible connectors which electrically interconnect risers or output and input connectors in the transformer 12 and the switchgear 14. That flexibility which exists in the interconnecting conductors between the transformer 12 and the switchgear 14 is primarily provided to assist in initially interconnecting the two devices and for compensating for variation in structural dimensions. Furthermore, it is capable of absorbing the effects of some relative movement between the two devices. However, it will be noted that the throat housing 16 which contains the interconnecting conductors is disposed relatively high on both the transformer 12 and the switchgear 14. During an earthquake or other significant seismic event, it is envisioned that the pad 18 will move or vibrate as a unit. The vibration may take on many forms including horizontal or vertical translation. If the transformer 12 and the switchgear 14 move correspondingly, that is, in a one to one relationship relative to each other, the housing 16 is relatively unaffected. However, it is known that the physical characteristics of devices like the transformer 12 and the switchgear 14 are such that resonant vibration may be set up due to the excitation of the vibrating plane or pad 18. These resonant vibrations may cause the transformer 14 and the switchgear 16 to move relative to each other, thus putting stress on the housing 16. The vibration may take the form of oscillatory vibration. It can take on any or all of a number of different types, including twisting, flexing or translational movement. The resonant frequencies of the device 12 and 14 may be such that at any point of time device 12 may be moving towards device 14 while device 14 is moving towards device 12. This would tend to crush the throat housing 16 especially at the height at which it is disposed. At the other extreme, the transformer 12 and the switchgear 14 may be moving away from each other at any instant of time which may tend to pull the housing 16 apart. Both of the latter conditions are undesirable. It has been determined that during severe earthquakes the amount of relative movement between the transformer 12 and the switchgear 14 can be as large as three or four inches, even though the bases of the devices do not move appreciably relative to each other. Furthermore, the damage caused by this translational change may cause the entire unit substation to fail, resulting in power interruption. It is especially important in situations involving nuclear power generating stations that the opportunity for the interruption of power be significantly diminished. The unit substation may comprise in the nuclear power generating system a class 1E power source as defined in the IEEE Standard 308-174, which is as follows:

"The safety classification of the electric equipment and systems that are essential to emergency reactor shutdown, containment isolation, reactor core cooling, and containment and reactor heat removal, or otherwise are essential in preventing significant release of radioactive material to the environment."

It is therefore required in the design of nuclear power generating station power sources of which the unit substation 10 shown in FIG. 1 may be a part that the equipment continue to perform during and after an earthquake.

Figure 2:
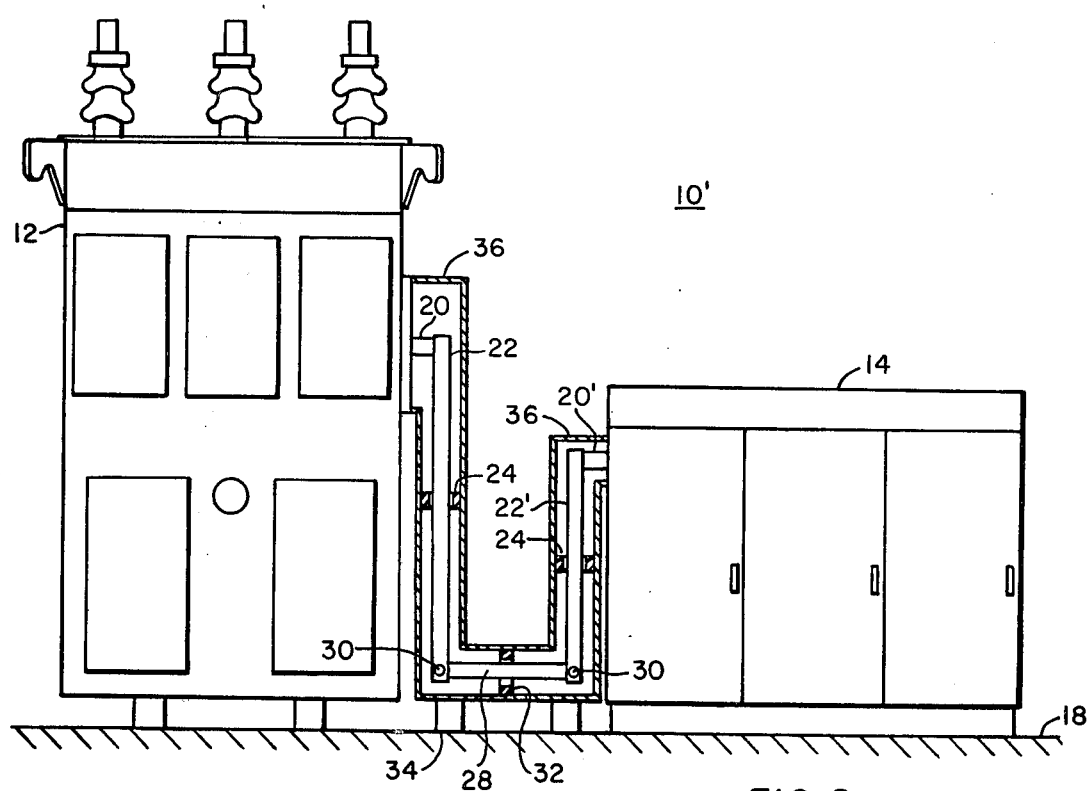
FIG. 2 shows a unit substation, similar to that shown in FIG. 1, in elevation and partially broken away for seismic tolerant interconnection apparatus.

Referring now to FIG. 2 relatively flexible apparatus for effectively physically decoupling the transformer 12 and the switchgear 14 so that they can move relative to each other without damaging each other or the electrical connection between them is shown. It is to be noted that the decoupling connections are such that mechanical movement of one device relative to the other can take place without electrical continuity being significantly disturbed. Consequently the interconnecting device must continue to carry current even through various flexures and movements may be taking place. In the present case a first electrical unit or transformer 12 is interconnected with the second electrical unit or switchgear 14 in a decoupled or seismic tolerant unit substation or substation apparatus 10'. A support pad 18 which may comprise a relatively flat horizontal concrete base is provided. It is envisioned that this pad 18 will vibrate as a unit during a seismic event. To the high voltage connector 20 of the transformer 12 is interconnected a vertical bus bar 22. Likewise to the high voltage connector 20' of the switchgear 14 is connected a vertical bus bar 22'. Spacers 24 may be provided to rigidly affix the disposition of the bus bars relative to each other and relative to the apparatus to which it is attached. A portion of the bus bars 22 and 22' near the bottom of each may be disposed without spacer support so that they may flex under certain conditions to accommodate relative changes in disposition between the transformer 12 and switchgear 14. The bottom portion of each of the bus bars 22 and 22' are terminated near the bottom of the transformer 12 and the switchgear 14 which they are connected to. At or near this point a rigid or flexible, horizontal, interconnecting bus bar 28 is pivotally electrically connected to the bus bars 22 and 22' with a rotating joint apparatus 30. Furthermore, a centrally disposed spacer 32 is provided for the interconnecting bus bar 28. The purpose of the spacer 32 will be described hereinafter with respect to other figures. The entire bus bar arrangement including the bus bars 22 and 22' and the interconnector 28 may be enclosed in a bus run 36 which in some embodiments of the invention may be flexible, as will be described hereinafter. During a seismic event it is envisioned that the bus bars 22, 22' and the interconnector 28 will be forced into horizontal, vertical or angular movement in the plane which generally corresponds to the plane of FIG. 2, although this is not limiting. The bus run 36 is supported on the bottom by convenient support means 34. It is to be noted that it is near the bottom of the apparatus that the horizontal components of motion for a given vibration are least pronounced relative to the top portions of the apparatus 12 and 14.

Figure 3:
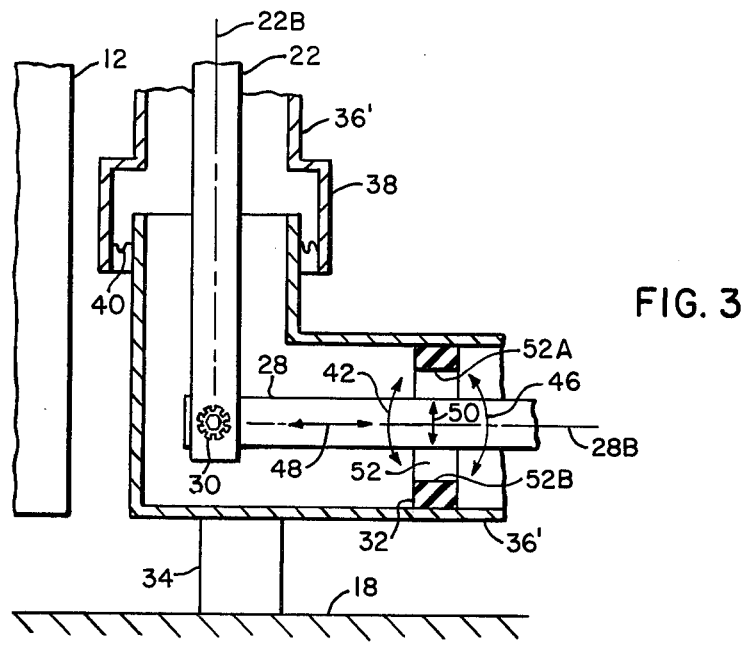
FIG. 3 shows a magnified portion of the apparatus of FIG. 2.

Referring now to FIG. 3, it is to be noted that the bus run 36 of FIG. 2 has been replaced by a flexible bus run 36', the purpose and operation of which will be described herewith. Bus run 36' has an overlapping flange region 38 which has a relatively wide opening for accepting a portion of a matching bus run 36' shown at the bottom of FIG. 3. Crushable material 40 is disposed between the flange of the overlapping bus run 36' and the bottom portion thereof to make the region inside of the bus run 36' relatively secure. One portion of the bus run 36' may move relative to the other portion, thus crushing some of the crushable material 40 but nevertheless maintaining the integrity of the entire bus run 36'. The transformer 12 is shown to the left for purposes of locating the section of interconnecting conductor. The pad 18 upon which the bus run 36' is disposed by way of supports 34 is also shown. The interconnecting apparatus of FIG. 3 is shown in a normal non-seismic operating position where the bus bar 22 is disposed in a general vertical orientation relative to the pad 18 and where the interconnecting bus bar 28 is shown disposed in a general horizontal orientation with respect to the pad 18. The interconnecting bus bar 28 is joined to the vertical bus bar 22 by way of a rotating joint member 30 (such as described in U.S. Pat. No. 3,944,772 issued Mar. 16, 1976 to N. Davies and assigned to the assignee of the present application) which provides lateral compression between the bus bar 22 and the interconnecting bus bar 28 while nevertheless providing a rotating capability between the latter two members. The non-restraining spacer 32 described with respect to FIG. 2 is shown. It will be noted in the embodiment of the invention shown in FIG. 3 that an elongated vertical slot 52 is disposed in the spacer 32 to allow the interconnecting bus bar 28 to rotate therein in the angular directions 42 or 46 or to translate vertically in the vertical directions 50. Furthermore, horizontal translation in the direction 48 is allowed by the disposition of the non-restraining clamp 32. The term non-restraining is used with respect to the plane of FIG. 3, which for purposes of simplicity will be identified as a vertical plane. Sideways movement of the bus bar 28, i.e. into and out of the plane of FIG. 3, is restrained. During a seismic event it is envisioned that the rotating joint 30 will allow the disposition of the bus bar 22 with respect to the bus bar interconnector 28 to be such that the bus bar 28 interconnector can rotate in the directions 42 and 46 as was described previously or to translate in the directions 48 and 50 as was described previously or any combination of those directional movements. Naturally there would be restraints provided by the rigidity of the bus bar 22 and the connecting bus bar 28 and the relative position of the other bus bar 22' (not shown in FIG. 3). Furthermore, restraint is limited both angularly and translationally by the upper and lower edges 52A and 52B respectively of the slot 52. This means that relative movement of the bus bar 28 interconnector with respect to the bus bar 22 is generally non-restrained within limits.

Figure 4:
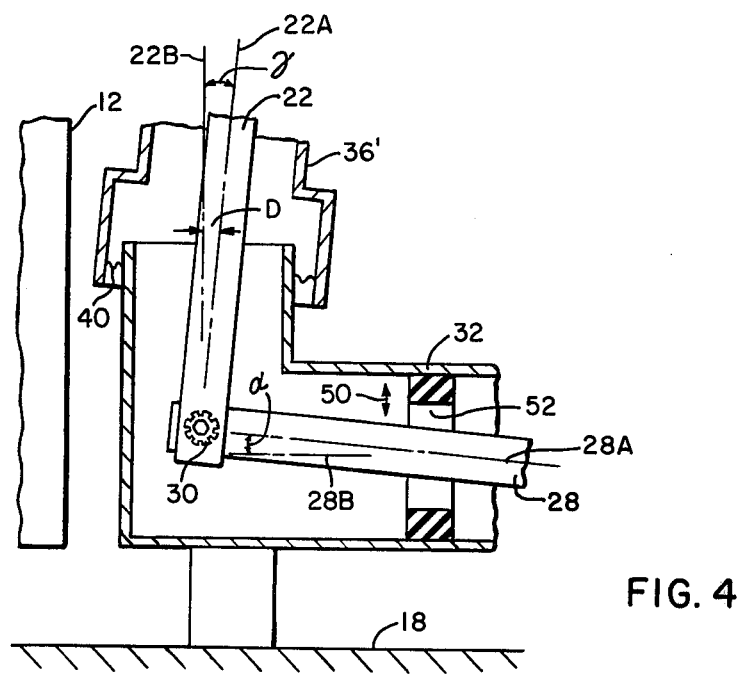
FIG. 4 shows what is generally shown in FIG. 3 but with the interconnecting apparatus in a different disposition such as might occur during a seismic event.

Referring now to FIG. 4 the interconnection shown in FIG. 3 is depicted for an angular displacement of the generally vertical bus bar 22 and the generally horizontal interconnecting bus bar 28. Depending upon the arrangement of the spacers 24 such as are best shown in FIG. 2, the angular displacement $\gamma$ from the vertical may necessitate flexure or displacement of the top portion of the bus run 36' relative to the bottom portion thereof thus causing the aforementioned crushable material 40 to accommodate such a change. In this embodiment of the invention it is presumed that the relative disposition of the bus bar 22' (not shown) is such that the interconnecting bus bar 28 assumes an angular displacement $\alpha$ from the horizontal. The angle $\alpha$ is measured from the horizontal centerline 28B of the bus bar 28 when in the non-accommodating position, such as is shown in FIG. 3. Likewise the angle $\gamma$ is measured from the vertical centerline 22B of the same Figure. It will also be noted that the relative position of the bus bar 28 within the spacer slot 52 of the spacer 32 is such that freedom of movement in the upward or downward direction 50 remains unimpeded. In the embodiment of the invention shown in FIG. 4 the bus bar 22 has assumed an angular disposition between the non-accommodating centerline 22B of the bus bar 22 and the accommodating centerline 22A of the bus bar 22 to provide the angular offset $\gamma$. This represents a horizontal displacement D at the vertical level shown in FIG. 4 relative to the pad 18. It is expected that the horizontal displacement near the connector 20, such as shown in FIG. 2, will be significantly greater. It is to be noted, though, that the horizontal displacement is relatively small in the region where the bus bar 22 interconnects with the interconnecting bus bar 28 at the flexible joint 30. It is to be understood that the angles $\gamma$ and $\alpha$ need not be the same and that the degree of rotational flexibility at the joint 30 is such that a right angle need not exist between the bus bar 22 and the interconnecting bar 28. It is envisioned that during a seismic event the disposition of the bus bar 22 and the interconnecting bus bar 28 will change rapidly as the transformer 12 and the switchgear 14 (not shown) vibrate in relationship to the vibration of the pad 18.

It is to be understood with respect to the embodiment of this invention that only the effects of vibration in the plane represented in FIGS. 2–4 have been described and accommodated for. It is to be understood that vibration may occur in other planes without necessarily destroying the interconnecting bus runs. The illustrative examples and embodiments shown in FIGS. 2–4 are provided for the purpose of explaining the possible modes of operation of the seismic decoupling or interconnecting device which is disclosed herein. It is also to be understood that the relative dimensions are not limiting and are provided in exaggerated form for purposes of illustration. This is especially true with regard to the depiction of the angles $\alpha$ and $\gamma$. In another embodiment of the invention the spacer 24 may be disposed significantly closer to the rotating interconnection 30 than is depicted in the figures. It is also to be understood that the illustrative examples of a transformer and switchgear equipment are not limiting, as the decoupling seismic connecting device may be utilized in other types of unit substation apparatus. It is also to be understood that the operation and disposition assumed with respect to the embodiment of FIG. 4 will not necessarily cause the bus run 36' to be canted as is shown in FIG. 4. The disposition of the bus run 36' shown in FIG. 4 is provided for the purpose of simplicity of illustration. It is envisioned that much vibration accommodation may take place without disturbing the bus runs 36 or 36' as the case may be by any appreciable amount.

The apparatus taught with respect to the embodiments of this invention have many advantages. One advantage lies in the fact that substation equipment which may be subjected to seismic events such as earthquakes can be effectively mechanically decoupled within limits while nevertheless retaining significant, substantial and complete electrical continuity between the devices as served by the accommodating flexible decoupling connection. Another advantage lies in the fact that the effective decoupling operation may be part of power supply equipment for nuclear power stations which will enhance the safety of the nuclear power station. Another advantage lies in the fact that the effective decoupling of the interconnection between devices has a tendency to reduce the transmission of vibratory forcing functions between devices. Said in another way, this means that if the transformer, for example, tends to vibrate at a resonant frequency the flexible connection between it and the switchgear must absorb, within limits, the forcing functions which would tend to cause the switchgear to vibrate at the same frequency, or vice versa.

What I claim as my invention:

1. Substation apparatus of the kind which is disposed upon a horizontal pad where the pad has the characteristic of vibrating during a seismic event, comprising:
    (a) a first electrical unit disposed upon said pad for support thereby, said first unit having a first unit electrical connector with a flexible vertical span, said vertical span having a tendency to translate horizontally if unrestrained through a plane perpendicular to said pad during said seismic event;
    (b) a second electrical unit disposed upon said pad for support thereby, said second unit having a second unit electrical connector; and
    (c) generally rigid interconnector means pivotally disposed in electrically conducting relationship with a portion of said vertical span and disposed in electrically conducting relationship with said second unit connector for electrically interconnecting said first unit with said second unit, said interconnector means being disposed substantially in said plane, the angular disposition of said interconnector means relative to the surface of said pad changing within limits to accommodate said horizontal translation during said seismic event.

2. The combination as claimed in claim 1 wherein said flexible span bows toward said second unit when the horizontal translation of said vertical span is restrained by the attainment of an angular limit of disposition by said interconnecting means to thus provide an additional increment of horizontal translation during said seismic event.

3. Substation apparatus of the kind which is disposed upon a horizontal pad where the pad has the characteristic of vibrating during a seismic event, comprising:
   (a) a first electrical unit disposed upon said pad for support thereby, said first unit having a first unit electrical connector with a first flexible vertical span, said first vertical span having a tendency to translate horizontally if unrestrained through a plane perpendicular to said pad during said seismic event;
   (b) a second electrical unit disposed upon said pad for support thereby, said second unit having a second unit electrical connector with a second flexible vertical span, said second vertical span having a tendency to translate horizontally if unrestrained through said plane during said seismic event; and
   (c) generally rigid interconnector means pivotally disposed in electrically conducting relationship with a portion of said first vertical span and pivotally disposed in electrically conducting relationship with a portion of said second vertical span for electrically interconnecting said first unit with said second unit, said interconnector means being disposed substantially in said plane, the disposition of said interconnector means relative to the surface of said pad changing within limits to accommodate relative changes in horizontal translation between said first span and said second span during said seismic event.

4. The combination as claimed in claim 3 wherein the mode of change of disposition of said interconnecting means is angular rotation in said plane.

5. The combination as claimed in claim 3 wherein the mode of change of disposition of said interconnecting means is vertical translation in said plane.

6. The combination as claimed in claim 3 wherein the mode of change of disposition of said interconnecting means is horizontal translation in said plane.

7. The combination as claimed in claim 3 wherein the mode of change of disposition of said interconnecting means is a combination of angular rotation, vertical translation and horizontal translation in said plane.

8. The combination as claimed in claim 3 wherein at least one of said first and second flexible spans bows towards the other when the translation of said at least one flexible span is restrained to thus provide an additional increment of horizontal translation during said seismic event.

9. The combination as claimed in claim 3 wherein said first unit electrical connector and said second unit electrical connector comprise bus bars.

10. The combination as claimed in claim 9 wherein said interconnecting means comprises a bus bar.

11. The combination as claimed in claim 10 wherein all said bus bars are enclosed in bus run, said bus run having overlapping flange regions to permit relative motion between portions of said bus run during said seismic event.

12. A unit substation of the kind which is disposed upon a horizontal pad, where the pad has the characteristic of vibrating during a seismic event, comprising:
   (a) a transformer disposed upon said pad, said transformer having a flexible bus bar disposed along the side thereof from a connector on the top thereof to a place significantly closer to the bottom thereof than to the top thereof, said transformer having a tendency to vibrate during said seismic event, said vibration being in a plane which is perpendicular to said pad, said vibration being more pronounced at the top of said transformer than at the bottom thereof, that part of said bus bar which is near the bottom of said transformer thus moving less than that part of said bus bar which is near said latter connector;
   (b) switchgear disposed upon said pad, said switchgear having a flexible bus bar disposed along the side thereof from a connector on the top thereof to a place significantly nearer the bottom thereof than to the top thereof, said switchgear having a tendency to vibrate during said seismic event, said vibration being in said plane, said vibration being more pronounced at the top of said switchgear than at the bottom thereof, that part of said bus bar which is near the bottom of said switchgear thus moving less than that part of said bus bar which is near said latter connector; and
   (c) a generally rigid bus bar interconnector pivotally disposed in electrically conducting relationship with said transformer bus bar and said switchgear bus bar for electrically interconnecting said transformer with said switchgear, said bus bar interconnector being disposed in said plane, the disposition of said bus bar interconnector relative to the surface of said pad changing within limits to accommodate the relative movement of said transformer bus bar and said switchgear bus bar during said seismic event.

13. The combination as claimed in claim 12 wherein the mode of change of disposition of said interconnecting bus bar is angular rotation in said plane.

14. The combination as claimed in claim 12 wherein the mode of change of disposition of said interconnecting bus bar is vertical translation in said plane.

15. The combination as claimed in claim 12 wherein the mode of change of disposition of said interconnecting bus bar is horizontal translation in said plane.

16. The combination as claimed in claim 12 wherein the mode of change of disposition of said interconnecting bus bar is a combination of angular rotation, vertical translation and horizontal translation in said plane.

17. The combination as claimed in claim 12 wherein at least one of said flexible bus bars bows towards the other when the relative movement of said bus bars is restrained by the attainment of a limit of disposition of said interconnecting means to thus provide an additional increment of movement during said seismic event.

18. Substation apparatus of the kind which is disposed upon a horizontal pad where the pad has the characteristic of vibration during a seismic event, comprising:
   (a) a first electrical unit disposed upon said pad for support thereof, said first unit having a first unit electrical connector with a vertical span which extends from the top of said first unit to a position significantly nearer the bottom thereof than to the top thereof, said vertical span having a tendency to translate horizontally through a plane perpendicular to said pad during said seismic event;
   (b) a second electrical unit disposed upon said pad for support thereby, said second unit having a second unit electrical connector; and (c) generally flexible interconnector means disposed in electrically conducting relationship with a portion of said vertical span and disposed in electrically conducting relationship with said second unit connector for electrically interconnecting said first unit with said second unit and for accommodating the effect of said seismic event.

19. A unit substation of the kind which is disposed upon a horizontal pad, where the pad has the characteristic of vibrating during a seismic event, comprising:

(a) a transformer disposed upon said pad, said transformer having a bus bar disposed along the side thereof from a connector on top thereof to a place significantly near the bottom thereof than to the top thereof, said transformer having a tendency to vibrate during said seismic event, said vibration being more pronounced at the top of said transformer than at the bottom thereof, that part of said bus bar which is near the bottom of said transformer thus moving less than that part of said bus bar which is near said latter connector;

(b) switchgear disposed upon said pad, said switchgear having a bus bar disposed along the side thereof from a connector on the top thereof to a place significantly nearer the bottom thereof than to the top thereof, said switchgear having a tendency to vibrate during said seismic event, said vibration being more pronounced at the top of said switchgear than at the bottom thereof, that part of said bus bar which is near the bottom of said switchgear thus moving less than that part of said bus bar which is near said latter connector; and (c) a generally flexible bus bar interconnector disposed in electrically conducting relationship with said transformer bus bar and said switchgear bus bar for electrically interconnecting said transformer with said switchgear, the disposition of said bus bar interconnector relative to the surface of said pad changing within limits to accommodate the relative movement of said transformer bus bar and said switchgear bus bar during said seismic event.

* * * * *